Patented Feb. 7, 1933

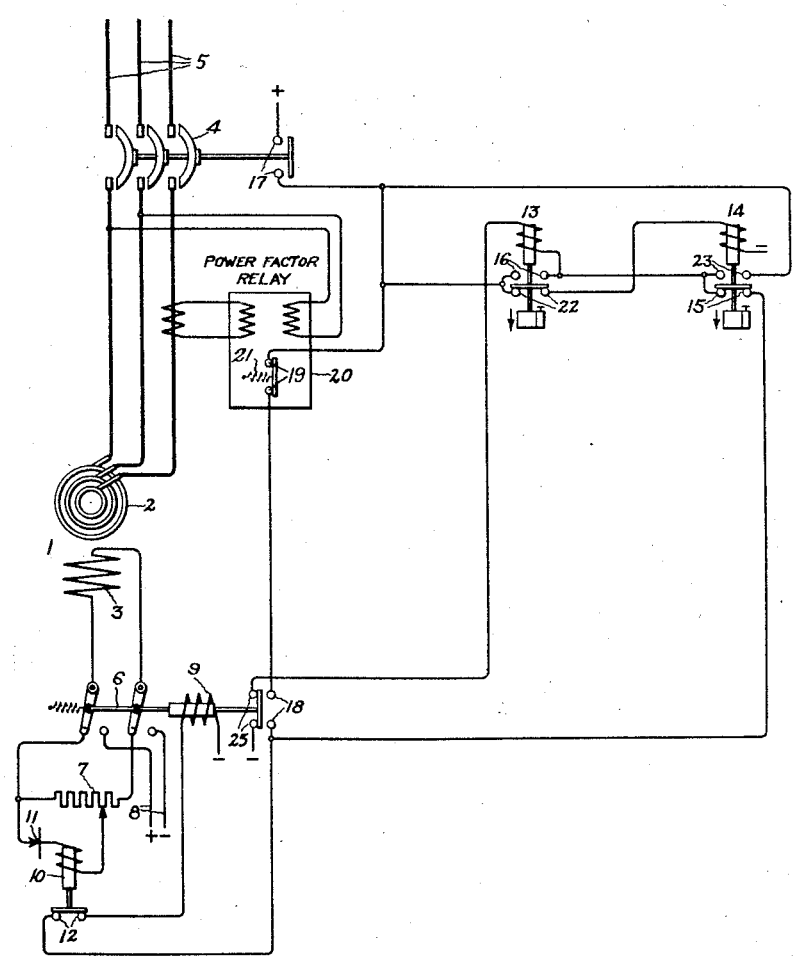

1,896,093

UNITED STATES PATENT OFFICE

DAVID W. McLENEGAN, OF SCHENECTADY, NEW YORK, ASSIGNOR TO GENERAL ELECTRIC COMPANY, A CORPORATION OF NEW YORK

CONTROL SYSTEM

Application filed January 23, 1932. Serial No. 588,358.

My invention relates to control systems and particularly to control systems for synchronous machines and its object is to provide an improved arrangement for effecting the disconnection of the field winding of a synchronous machine from its source of excitation when the machine falls out of synchronism. In accordance with my invention, I control the disconnection of the field winding in response to the power factor of the machine which is more lagging when the machine is operating out of synchronism than when the machine is operating at synchronous speed.

My invention will be better understood from the following description when taken in connection with the accompanying drawing which diagrammatically shows a synchronous motor control system embodying my invention and its scope will be pointed out in the appended claims.

In the accompanying drawing, 1 represents a synchronous motor which is provided with an armature winding 2 and a field winding 3. In order to simplify the disclosure, I have shown my invention in connection with a full voltage starting arrangement for the synchronous motor so that it is started by connecting the armature winding 2, by means of a suitable switch 4, directly across an alternating current supply circuit 5. Any suitable means, either manually or automatically controlled, may be employed for effecting the opening and closing of the switch 4. While I have shown a full voltage starting arrangement, it is to be understood, however, that my invention is applicable to any other suitable arrangement for starting a synchronous motor from rest and bringing it up to synchronous speed.

The connections of the motor field winding 3 are effected by suitable switching means such as a two-position switch 6 which, in one of its positions, connects a discharge resistor 7 across the terminals of the field winding 3 and which, in its other position, connects the field winding 3 across a suitable source of excitation 8. The operation of the switching means 6 may be controlled by any suitable speed responsive device so that during the starting operation of the motor the discharge resistor 7 is connected across the terminals of the field winding 3 and during normal running operation the field winding 3 is connected across the source of excitation 8. A suitable closing coil 9 is provided for moving the switch 6 to its running position. In the drawing I have shown the speed responsive arrangement disclosed and claimed in the copending application of Harold T. Seeley, Serial No. 541,315, filed June 1, 1931, and assigned to the assignee of this application. This speed responsive arrangement consists of a relay 10 and a rectifier 11 connected in series across a portion or all of the discharge resistor 7 so that the voltage of slip frequency induced in the field winding 3 while the motor is operating below synchronous speed causes a pulsating current to flow through the coil of relay 10. Until the motor reaches substantially synchronous speed, this pulsating current maintains the relay contacts 12, in the circuit of the closing coil 9 of the switch 6, open. When, however, the motor reaches approximately synchronous speed, the frequency of the induced current in the field winding 3 becomes so low that the portion of each cycle of induced field current during which no current flows through the coil of relay 10 is sufficiently long to allow the relay contacts 12 to close and complete the circuit of the closing coil 9 of the switch 6. Any suitable means, examples of which are well known in the art, may be provided for varying the drop out point of the relay 10.

The circuit of the closing coil 9 is also controlled by the time relays 13 and 14 so that the closing coil 9 can not be energized during the starting operation until after the switch 4 has been closed a predetermined time and, in case it becomes de-energized after the starting operation has been completed, the closing coil 9 can be re-energized only after the field winding 3 has remained disconnected from the source of excitation 8 for a predetermined time. The relays 13 and 14 are arranged so that when the switch 4 is closed to start the motor, the relay 14 is energized and completes an energizing circuit for the coil of relay 13 which, in turn, completes a locking circuit for its coil. The energization of the relay 13 effects the de-energization of the coil of relay 14 which, after a predetermined time, closes its contacts 15 which are in series with contacts 16 of relay 13 and the auxiliary contacts 17 on switch 4. When the switch 6 operates to connect the field winding 3 to the source of excitation 8, the circuit of relay 13 is opened by the contacts 25 on the switch 6. A predetermined time after the coil of relay 13 is de-energized, the relay opens its contacts 16 in the original energizing circuit for the closing coil 9. Before the contacts 16 open, however, the switch 6 completes, through its auxiliary contacts 18, a locking circuit for its closing coil 9. This arrangement for controlling the operation of the switching means 6 is disclosed and claimed in the copending application of S. C. Ewing, Serial No. 588,361, filed January 23, 1932.

In the locking circuit of the closing coil 9, I also provide, in accordance with my invention, the contacts 19 of a suitable power factor relay 20, the windings of which are connected to the armature circuit of the motor 1 in any suitable manner, examples of which are well known in the art, so that as long as the power factor of the motor is above a predetermined lagging value, the relay 20 maintains its contacts 19 closed. I find that when a synchronous motor falls out of synchronism, the power factor of the motor decreases materially from its normal running value and I employ this characteristic of the motor to effect the operation of the switching means 6 to disconnect the motor field winding 3 from the source of excitation 8 when the motor falls out of synchronism. In order, however, to prevent the power factor relay 20 from operating to open its contacts 19 in response to reverse lagging power in case the motor operates as a generator, the contacts 19 are preferably biased to their closed position by a spring 21 so that at least normal full load current is required to produce enough torque to open the contacts.

The operation of the arrangement shown in the drawing is as follows: When it is desired to start the motor, the switch 4 is closed to connect the motor armature winding 2 directly across the supply circuit 5. As soon as the armature winding 2 is energized, a voltage of slip frequency is induced in the field winding 3 and this induced voltage causes sufficient pulsating current to flow through the coil of relay 10 to cause the relay to open its contacts 12 which are in the energizing circuit of the closing coil 9 of the switch 6.

When the switch 4 is closed, its auxiliary contacts 17 complete, through the contacts 22 of the relay 13, an energizing circuit for the coil of relay 14. The relay 14 immediately opens its contacts 15 and closes its contacts 23 to complete through the auxiliary contacts 17 on the switch 4 and the auxiliary contacts 25 on the switch 6 an energizing circuit for the coil of relay 13. The relay 13 then opens its contacts 22 in the circuit of the coil of relay 14 and closes its contacts 16 so as to complete a locking circuit for the coil of relay 13 which is independent of the contacts 23 of the relay 14. After the contacts 22 of the relay 13 have been opened for a predetermined time, the relay 14 opens its contacts 23 and closes its contacts 15 so that the contacts 17, 16 and 15 are connected in series. It will be seen that this series circuit is not completed until after the switch 4 has been closed a predetermined time. In this manner, sufficient time elapses after the closing of switch 4 for the relay 10 to operate and open its contacts 12 before the circuit for the closing coil 9 can be completed through these series connected contacts.

When the motor reaches approximately synchronous speed, the relay 10 closes its contacts 12 and completes an energizing circuit for the closing coil 9 through the series connected contacts 15, 16 and 17. The energization of the closing coil 9 causes the switch 6 to open the circuit of the field winding 3 through the discharge resistor 7 and to connect the field winding 3 to the source of excitation 8 so that the motor pulls into synchronism.

When the switch 6 operates in response to the energization of the closing coil 9, the auxiliary contacts 18 on switch 6 complete, through the contacts 19 of the power factor relay 20, a locking circuit for the closing coil 9. This locking circuit is independent of the contacts 15 and 16 of the relays 14 and 13 respectively. When the switch 6 operates, its auxiliary contacts 25 are also opened so that the circuit of the coil of relay 13 is interrupted. After the relay 13 has been de-energized for a predetermined time, it opens its contacts 16 and closes its contacts 22 to complete the energizing circuit for the coil of relay 14. The relay 14 then opens its contacts 15 and closes its contacts 23 to prepare an energizing circuit for the coil of relay 13. It will be seen that due to the delayed action of the relay 13 in opening its contacts 16, the original energizing circuit for the closing coil 9 through the contacts 15 and 16 is maintained for a predetermined time after the locking circuit through the contacts 18 and 19 is completed. This time delay is provided so as to prevent any pulsations in the power factor, while the motor is pulling into synchronism, from effecting the de-energization of the closing coil 9.

While the motor is operating at synchronous speed, the power factor of the motor is such that the relay 20 maintains its contacts 19 closed. When, however, the motor is pulled out of synchronism, a relatively large lagging current flows through the motor armature winding and the power factor of the motor is decreased to such a low value that the relay 20 opens its contacts 19. The opening of the contacts 19 interrupts the holding circuit of the closing coil 9 so that the switch 6 operates to disconnect the field winding 3 from the source of excitation 8 and to connect the discharge resistor 7 across the terminals of the field winding 3.

When the switch 6 operates in response to the de-energization of the closing coil 9, the closing of its auxiliary contacts 25 completes the circuit of the coil of relay 13 through the contacts 23 of the relay 14. The relay 13 immediately opens its contacts 22 and closes its contacts 16 to complete a locking circuit for its operating coil. A predetermined time after the relay contacts 22 are opened, the relay 14 opens its contacts 23 and closes its contacts 15 which are in series with the contacts 16 and 17. Therefore, it will be seen that the original energizing circuit for the closing coil 9 of the switch 6 cannot be reclosed, when the motor is pulled out of synchronism, until after the field winding 3 has remained disconnected from the source of excitation 8 for a predetermined time.

After the relay contacts 15 are closed, the closing coil 9 is re-energized as soon as the motor again reaches substantially synchronous speed so that the contacts 12 of the relay 10 are again closed. The energization of the closing coil 9 then effects the normal running field connections of the motor in the manner above described.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is:

1. In combination, a synchronous machine having a field winding, a source of excitation connected to said field winding, and means responsive to the power factor of said machine for disconnecting said source from said field winding when said machine falls out of synchronism.

2. In combination, a synchronous machine having a field winding, a source of excitation connected to said field winding, means responsive to the power factor of said machine for disconnecting said source from said field winding when said machine falls out of synchronism, and means responsive to the speed of said machine for reconnecting said source to said field winding when said machine reaches approximately synchronous speed.

3. In combination, a synchronous motor having a field winding, a source of excitation connected to said field winding, power factor responsive means connected to the armature circuit of said motor, and means controlled by said power factor responsive means for effecting the disconnection of said source from the field winding of said motor when said motor falls out of synchronism.

4. In combination, a synchronous motor having a field winding, a source of excitation connected to said field winding, power factor responsive means connected to the armature circuit of said motor, means controlled by said power factor responsive means for effecting the disconnection of said source from the field winding of said motor when said motor falls out of synchronism, and speed responsive means for reconnecting said source to said field winding when said motor reaches approximately synchronous speed.

5. In combination, an alternating current source, a synchronous motor having an armature connected to said source, a field winding for said motor, a source of excitation connected to said field winding, and power factor responsive means connected to the armature circuit of said motor for effecting while said armature remains connected to said alternating current source the disconnection of said field winding from said source of excitation when the power factor lags more than a predetermined amount.

6. In combination, an alternating current source, a synchronous motor having an armature connected to said source, a field winding for said motor, a source of excitation connected to said field winding, power factor responsive means connected to the armature circuit of said motor for effecting while said armature remains connected to said alternating current source the disconnection of said field winding from said source of excitation when the power factor lags more than a predetermined amount, and speed responsive means for reconnecting said source of excitation to said field winding when said motor reaches approximately synchronous speed.

In witness whereof, I have hereunto set my hand.

DAVID W. McLENEGAN.